Patented Oct. 8, 1929

1,731,150

UNITED STATES PATENT OFFICE

EMILE REBER AND JOSEPH SPIELER, OF BASEL, SWITZERLAND, ASSIGNORS TO SOCIETY OF CHEMICAL INDUSTRY IN BASLE, OF BASEL, SWITZERLAND

MONOAZO DYESTUFFS

No Drawing. Application filed November 22, 1927, Serial No. 235,112, and in Switzerland December 4, 1926.

The present invention relates to new dyestuffs which are particularly valuable for the production of fast tints on animal fiber. It comprises the new dyestuffs, the process of making these dyestuffs, and the material which has been dyed with the new products.

We have found that new yellow pyrazolone-azo-dyestuffs are obtained which correspond with the general formula:

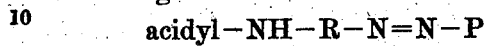

wherein R means an aryl nucleus of the benzene series which contains a sulfonic group in ortho-position and the acidye-group in meta-position to the azo-group, and P means the residue of a 1-aryl-5-pyrazolone, by coupling diazo-compounds of the general formula:

wherein R has the above mentioned signification, with 1-aryl-5-pyrazolone.

These new azo-dyestuffs, which form yellow to brown-yellow and orange-yellow powders, dissolving in water on addition of sodium carbonate solution with yellow color, dye wool or animal fibers uniformly throughout, yielding dyeings of excellent fastness to light. According to the choice of the components dyestuffs are obtained which are not only fast to water but also to acid fulling and to alkali and, under certain conditions, have good fastness to washing. The technical advance in the invention is due to the existence of all these properties in one and the same dyestuff. Another advantage of the process resides in the fact that even the 1-aryl-5-pyrazolone-3-carboxylic acids, which have yielded hitherto azo-dyestuffs of color strength but only moderately equalizing power, give rise to products which are excellently equalizing and fast.

As acids from which the acidyl-compounds may be derived there may be named among others, formic acid, acetic acid, arylcarboxylic acids (benzoic acid), arylsulfonic acids, carbonic acid, carbonic acid esters, oxalic acid, phthalic acid; and the dibasic acids among these may be combined with one or two molecules of diamine.

The pyrazolones applicable as coupling components comprise those which are obtainable from aceto-acetic ester or oxalo-acetic ester and hydrazine or hydrazine compounds. Among these latter may be mentioned particularly those which are derived from aniline, o-chloraniline, m-chloraniline, m-nitraniline, o-toluidine, p-xylidine, sulfanilic acid, toluidine sulfonic acid

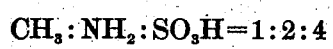

and 1:2:5, o-toluidine-sulfamide

xylidine sulfonic acid

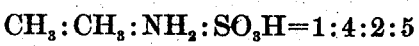

and 1:5:2:4, chloraniline sulfonic acid

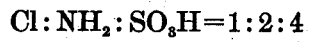

and the corresponding sulfamide, dichloraniline sulfonic acid

the naphthylamine sulfonic acids

1:5, 1:6, 1:7, 2:1, 2:5, 2:6, 2:7, 2:8, and the naphthylamine disulfonic acids

1:5:7, 2:3:6, 2:4:7 and 2:5:7, and so on.

The following examples illustrate the invention, the parts being by weight:—

Example 1

28.4 parts of 1-para-sulfophenyl-5-pyrazolone-3-carboxylic acid are dissolved in 150 parts of water by means of 20 parts of calcined sodium carbonate. The solution is cooled with ice and mixed with the diazo-compound from 23 parts of 4-acetyl-amino-2-amino-1-benzenesulfonic acid. The dyestuff thus formed separates in part. By addition of common salt precipitation is completed; the whole is then made as neutral as possible, filtered and the solid matter dried. The dyestuff thus obtained is a yellow powder; it dyes wool in a sulfuric acid bath very uniform powerful tints, similar to those of tartrazine i. e. the pyrazolone dyestuff of the formula

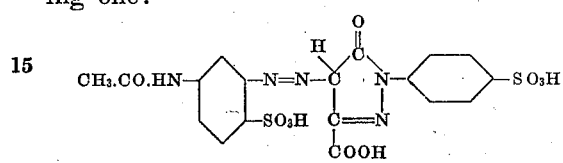

The dyeings are of very good fastness to light, water and alkali and withstand acid fulling. The formula of the new dyestuff corresponds very probably with the following one:—

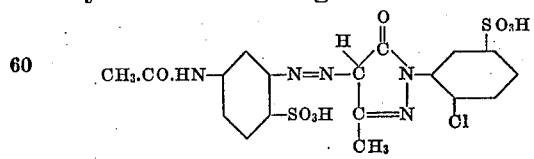

If for the said pyrazolone there are substituted 30 parts of 1-(4'-sulfo-2'-methyl)-phenyl-5-pyrazolone-3-carboxylic acid there is obtained a greenish-yellow dyestuff of the same advantageous fastness. The dyestuff from 1-(4'-sulfo-2'-methyl-6'-halogen)-phenyl-5-pyrazolone-3-carboxylic acid dye with similar properties but still purer and more greenish tints.

The diazo-compounds of the acidyl-compounds substituted in the nucleus, such as 5-methyl-4-acetylamino-2-amino-1-benzenesulfonic acid, or the compound chlorinated in 5-position, yield similar dyestuffs with 1-sulfo-aryl-5-pyrazolone-3-carboxylic acid.

With similar final results, the formyl-compounds or the urethanes or the oxalyl-compounds of the said diamino-sulfonic acids may be used as diazotizing components. As improvement of the fastness to washing of the dyestuffs may be secured by using as diazotizing components those which contain an aromatic nucleus in the acidyl residue, such as benzoyl-, phthalic- or arylsulfonic acid derivatives.

*Example 2*

The diazo-compounds from 23 parts of acet-phenylenediaminesulfonic acid of Example 1 is coupled with an ice-cooled solution, alkaline with sodium carbonate, of 29 parts of 1-(5'-sulfo-2'-chloro)-phenyl-3-methyl-5-pyrazolone. The dyestuff, salted out in the usual manner from the mass which has been made neutral, dyes wool very equal greenish yellow tints fast to light, water and alkali and resistant to acid fulling. The formula of the new dyestuff corresponds very probably with the following one:—

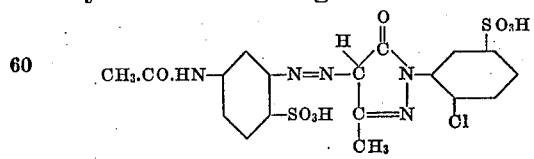

A similar product is obtained when there is substituted for the pyrazolone chlorinated in the aryl nucleus the pyrazolone which is obtainable from 1-amino-2-para-toluenesulfone-5-benzenesulfonic acid and aceto-acetic ester, or if urethane or formyl- or oxalyl-compounds are substituted for the acetyl-compound. In these cases also the fastness to washing can be enhanced by using benzoyl-compounds. The pyrazolones which are derived from unsulfonated bases, such as aniline, ortho-toluidine and xylidine, yield dyestuffs which have a remarkable fastness to washing. Particularly worthy of mention are for example the dyestuffs from 4-benzoyl-amino-2-diazo-1-benzenesulfonic acid and the 1-phenyl- or 1-(2'-chloro)-phenyl-3-methyl-5-pyrazolones.

What we claim is:—

1. As new products the yellow azo-dyestuffs of the general formula:

$$\text{acidyl}-\text{NH}-\text{R}-\text{N}=\text{N}-\text{P}$$

wherein R means an aryl nucleus of the benzene series which contains a sulfonic group in ortho-position and the acidyl-NH-group in meta-position to the azo-group, and wherein P means the residue of a 1-aryl-5-pyrazolone, which are obtained by coupling diazo-compounds of the general formula:

$$\text{acidyl}-\text{NH}-\text{R}-\text{N}=\text{N}-\text{OH}$$

wherein R has the above mentioned signification, with 1-aryl-5-pyrazolones, which form yellow to brown and orange-yellow powders, dissolving in water on addition of sodium carbonate solution with yellow color, and dyeing wool in very equal yellow tints which are particularly characterized by their good to very good fastness to alkali and light.

2. As new products the yellow azo-dyestuffs of the general formula:

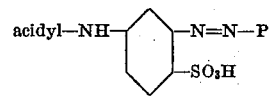

wherein P means the residue of a 1-aryl-5-pyrazolone, which are obtained by coupling diazo-compounds of the general formula:

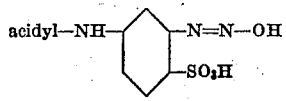

with 1-aryl-5-pyrazolones, which form yellow to brown and orange-yellow powders, dissolving in water on addition of sodium carbonate solution with yellow color, and dyeing wool in very equal yellow tints which are particularly characterized by their good to very good fastness to alkali and light.

3. As new products the yellow azo-dyestuffs of the general formula:

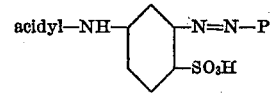

wherein P means the residue of a 1-aryl-5- pyrazolone the aryl nucleus of which belongs to the benzene series, which are obtained by coupling diazo compounds of the general formula:

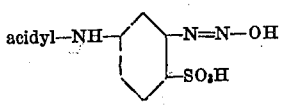

with such 1-aryl-5-pyrazolones the arylnucleus of which belongs to the benzene series, which form yellow to brown and orange-yellow powders, dissolving in water on addition of sodium carbonate solution with yellow color, and dyeing wool in very equal yellow tints which are particularly characterized by their good to very good fastness to alkali and light.

4. As new products the yellow azo-dyestuffs of the general formula:

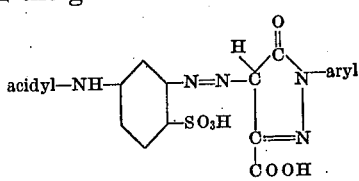

the aryl nucleus of which belongs to the benzene series, which are obtained by coupling diazo-compounds of the general formula:

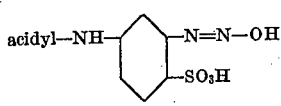

with such 1-aryl-5-pyrazolone-3-carboxylic acids the aryl nucleus of which belongs to the benzene series, which form yellow to brown and orange-yellow powders, dissolving in water on addition of sodium carbonate solution with yellow color, and dyeing wool in very equal yellow tints which are particularly characterized by their good to very good fastness to alkali and light.

5. As new products the yellow azo-dyestuffs of the general formula:

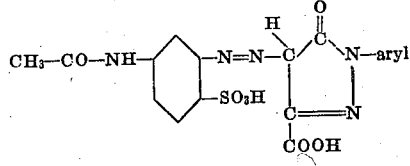

the aryl nucleus of which belongs to the benzene series, which are obtained by coupling the diazo-compound of the formula:

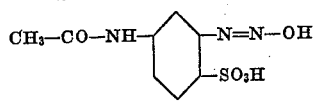

with such 1-aryl-5-pyrazolones the aryl nucleus of which belongs to the benzene series, which form yellow to brown and orange-yellow powders, dissolving in water on addition of sodium carbonate solution with yellow color, and dyeing wool in very equal yellow tints which are particularly characterized by their good to very good fastness to alkali and light.

6. As new products the yellow azo-dyestuffs of the general formula:

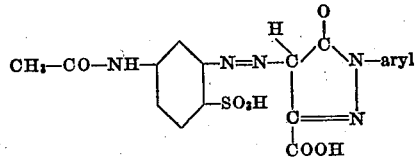

the aryl nucleus of which belongs to the benzene series and contains as substitutent at least one sulfonic group, which are obtained by coupling the diazo-compound of the formula:

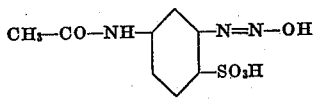

with such 1-aryl-5-pyrazolone-3-carboxylic acids the aryl nucleus of which belongs to the benzene series and contains as substituent at least one sulfonic group, which form yellow to brown and orange-yellow powders, dissolving in water on addition of sodium carbonate solution with yellow color, and dyeing wool in very equal yellow tints which are particularly characterized by their good to very good fastness to alkali and light.

7. Material dyed with the dyestuffs of claim 1.

8. Material dyed with the dyestuffs of claim 2.

9. Material dyed with the dyestuffs of claim 3.

10. Material dyed with the dyestuffs of claim 4.

11. Material dyed with the dyestuffs of claim 5.

12. Material dyed with the dyestuffs of claim 6.

In witness whereof we have hereunto signed our names this 10th day of November, 1927.

EMILE REBER.
JOSEPH SPIELER.